United States Patent [19]

Krayer

[11] 4,444,614

[45] Apr. 24, 1984

[54] ULTRASONIC WELDING DEVICE

[75] Inventor: Bernhard Krayer, Schaffhausen, Switzerland

[73] Assignee: SIG-Schweizerische Industrie-Gesellschaft, Neuhausen am Rheinfall, Switzerland

[21] Appl. No.: 435,337

[22] Filed: Oct. 19, 1982

[30] Foreign Application Priority Data

Nov. 2, 1981 [CH] Switzerland .................. 6996/81

[51] Int. Cl.³ .................................. B29C 27/08
[52] U.S. Cl. .................. 156/580.2; 156/73.1; 228/1 R
[58] Field of Search ............ 156/73.1, 73.4, 580.1, 156/580.2, 583.91; 228/1 R; 264/23; 425/174.2; 100/211

[56] References Cited

U.S. PATENT DOCUMENTS

| | | | |
|---|---|---|---|
| 3,526,792 | 9/1970 | Shoh | 310/316 |
| 3,837,977 | 9/1974 | Rust, Jr. | 156/580.1 |
| 3,904,457 | 9/1975 | Laughlin | 156/73.4 |
| 4,227,959 | 10/1980 | Brown | 156/580.2 |
| 4,279,675 | 7/1981 | Braun | 156/73.1 |

FOREIGN PATENT DOCUMENTS 613170  9/1979  Switzerland .

*Primary Examiner*—Michael G. Wityshyn
*Attorney, Agent, or Firm*—Spencer & Frank

[57] ABSTRACT

An ultrasonic welding device includes a sonotrode emitting vibratory energy and an anvil having a work face cooperating with the sonotrode for supporting a workpiece positioned for welding between the sonotrode and the anvil. The anvil has a housing and a plurality of laminae individually shiftably supported in the housing in a face-to-face relationship for forming a lamina stack. Each lamina has an edge face at a side of the lamina stack; the edge faces together constitute the work face of the anvil. There is also provided a force exerting arrangement for imparting individually to each lamina a force oriented towards the sonotrode for individually urging each lamina outwardly of the housing in the direction toward the sonotrode.

13 Claims, 6 Drawing Figures

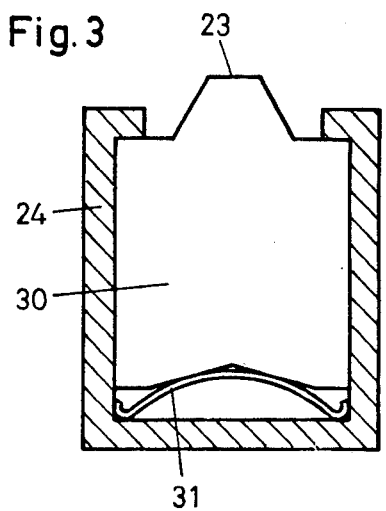
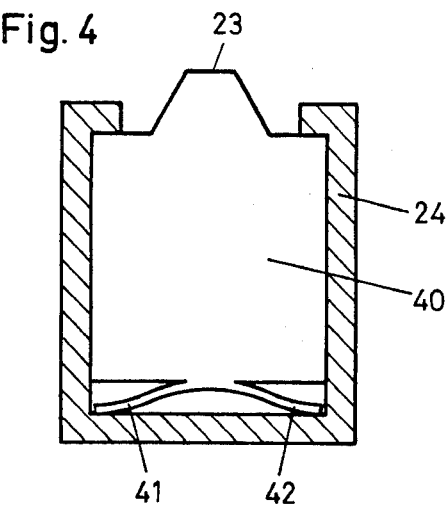
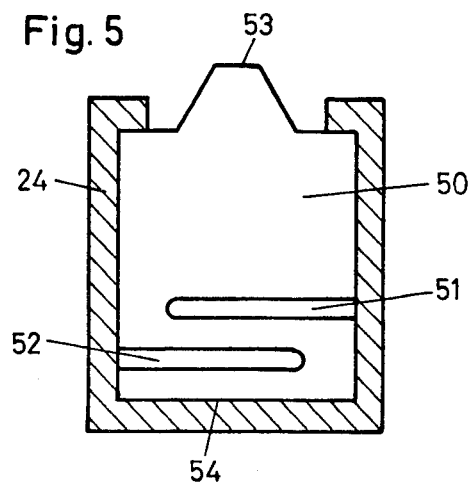
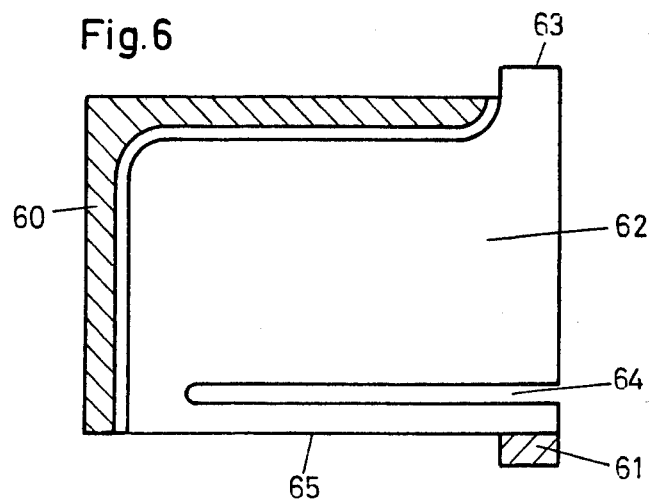

ULTRASONIC WELDING DEVICE

BACKGROUND OF THE INVENTION

This invention relates to an ultrasonic welding device, particularly for welding together superposed films and comprises an elongated energy concentrating horn (hereafter "sonotrode").

Swiss Pat. No. 613,170 discloses vibration welding for welding a cardboard coated with a thermoplastic material. In this arrangement mechanical energy is transformed to local heat energy in order to reduce the required heat and energy quantities. Further, U.S. Pat. No. 3,526,792 discloses an ultrasonic transducer which comprises a converter for changing electrical energy into mechanical energy and a sonotrode, by means of which the mechanical energy is concentrated as an oscillating energy with a predetermined frequency of oscillation. In operation, the sonotrode cooperates with an anvil whereby the coated parts are pressed together between the work face of the sonotrode and the work face of the anvil. The oscillation of the sonotrode generates in the compressed workpiece frictional heat which is sufficient to activate the thermoplastic layers in such a manner that the thermoplastic material of the layers flow together. Upon stopping the oscillation, the thermoplastic material cools and solidifies and, as a result, the superposed layers are bonded to one another.

U.S. Pat. No. 4,279,675 describes an application of the above-outlined welding method in the packaging industry. The anvil is, at the edge of its work face and in a central portion thereof, provided with a cutout to accommodate the increased thicknesses of superimposed cardboard portions. Between the cutouts there are provided longitudinally arranged grooves to allow the liquefied thermoplastic material to be forced aside at the crests between adjoining grooves and to allow it to gather in the grooves to form a weld.

It has been found that the above-outlined arrangement is insufficient in case there are multilayer portions at some locations as it is the case, for example, in longitudinal seams of tubular foil wrappers. Thus, there may be locations which remain unwelded which would cause air leaks in an evacuated package.

SUMMARY OF THE INVENTION

It is an object of the invention to provide an improved welding device of the above-outlined type from which the described disadvantages are eliminated and wherein an airtight weld is ensured independently from the number of layers to be welded to one another.

This object and others to become apparent as the specification progresses, are accomplished by the invention, according to which, briefly stated, the anvil of the welding device is formed of a plurality of individual, relatively displaceably supported laminae whose end faces constitute a counter support for the sonotrode and which are each exposed to a force directed toward the sonotrode.

BRIEF DESCRIPTION OF THE DRAWING

FIGS. 3, 4, 5 and 6 are schematic sectional front elevational views of four further preferred embodiments of the invention.

DESCRIPTION OF THE PREFERRED EMBODIMENTS

Figure 1:
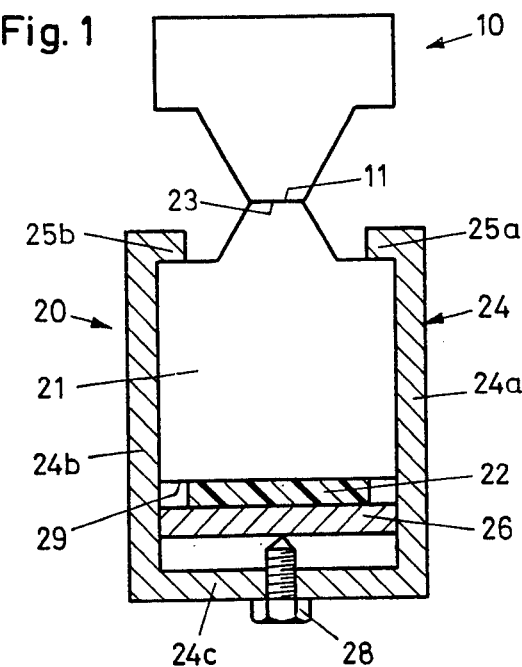
FIG. 1 is a schematic sectional front elevational view of a preferred embodiment of the invention.
Figure 2:
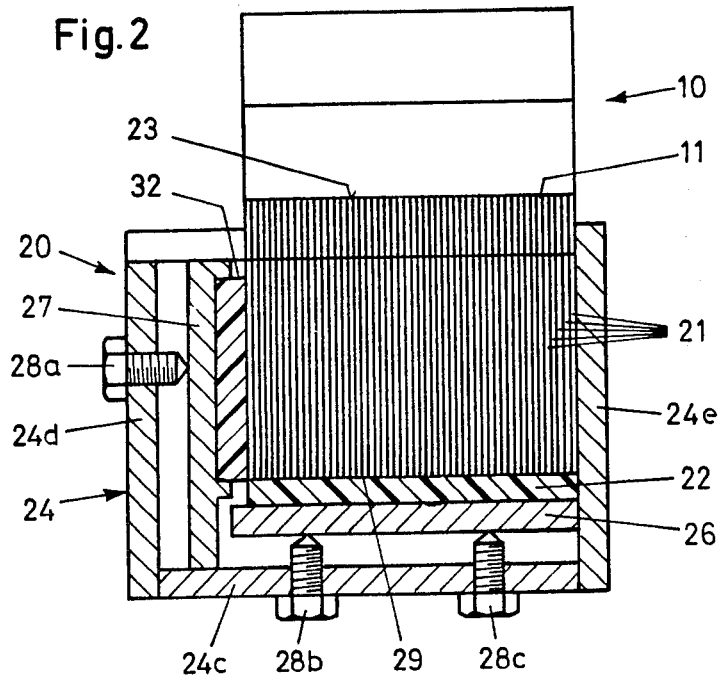
FIG. 2 is a schematic sectional side elevational view of the same embodiment.

Turning now to FIGS. 1 and 2, a sonotrode 10 of a conventional ultrasonic welding device has a work face 11 which engages a work face 23 of an anvil generally designated at 20. The latter is formed of a plurality of face-to-face arranged individual laminae 21 which are accommodated in a housing 24 formed of two side walls 24a, 24b, a bottom wall 24c, a front wall 24d and a rear wall 24e. The two side walls 24a and 24b have, at their top, longitudinally extending respective support flanges 25a, 25b which serve as retaining supports for the laminae 21. Within the housing 24 there are arranged a support base 26 and a pressure wall 27 which, by means of a screw 28a may be urged against the stack of laminae 21 for pressing the lamina stack together. Each lamina 21 engages, with an edge portion 29 which is remote from the work face 23, a cushion 22 of elastic material positioned on the support base 26. The latter and thus the bias exerted by the cushion 22 may be adjusted by two further setscrews 28b and 28c.

The mass of the individual laminae 21 is so designed that dynamic reaction forces of the oscillations can be taken up thereby. Thus, the laminae may be made of 1 mm thick brass sheets and for a given width of the work face 23 of 10 mm, the overall height and width of one lamina may be 45 mm and 40 mm, respectively. The cushion 22 may be a rubber insert having a rebound hardness of 40–45 Shore A. The length of the work face 23 of the lamina stack is in the order of magnitude of 65 mm.

It is thinkable that the laminae 21 clamped by the pressing wall 27 by means of setting a pressing force with the aid of setscrews 28a may loosen because of temperature fluctuations. In order to avoid such an undesirable occurrence, between the pressing wall 27 and the lamina stack there is provided a spring element 32 which may be an elastic cushion and which compensates for such a slack.

Tests with an anvil 20 formed of laminae as described above have shown that in case of a herringbone seam or a transverse fold comprising four layers of material each, a gastight weld could be obtained independently whether the outer layer of the material was paper or a thermoplastic material.

FIGS. 3, 4 and 5 show three further preferred embodiments of the invention as an alternative to the resilient cushion 22 of the embodiment described in connection with FIGS. 1 and 2. In these three embodiments, a housing identical to the housing 24 may find application and also, a slack compensator spring element 32 may used.

Turning now specifically to FIG. 3, a resilient displacement of the individual laminae 30 is effected by separate arcuate springs 31, associated with each laminae 30 and engaging the bottom edge of the laminae 30 and the bottom surface of the housing 24.

The embodiment illustrated in FIG. 4 is in principle similar to that described in connection with FIG. 3 except that instead of a separate spring, each lamina 40 is provided with resilient legs 41 and 42 which form an integral, one-piece part with the lamina 40.

Turning now to FIG. 5, each lamina 50 is provided with two elongated cutouts (slots) 51 and 52 which are spaced from one another and which extend from opposite side edges of the lamina parallel to the bottom edge 54 which is opposite from the work face 53. The slots 51 and 52 are in an overlapping relationship approximately along two-thirds of their length.

Turning now to the embodiment illustrated in FIG. 6, there is shown an angle profile 60 and a counter support rod 61 which are held together by means of two lateral walls (not shown) and which serve for supporting a plurality of laminae 62 each having a work face 63 and a cutout 64 for forming a support portion for a resilient positioning of the work face 63. Each lamina 62 has an edge face 65 which is opposite the work face 63 and which bounds the resilient support portion of the lamina. A slack compensator indentical to component 32 of the FIG. 2 embodiment may be included in the construction of the FIG. 6 arrangement.

It is a common characteristic of all embodiments that each individual lamina is capable of setting itself—by virtue of its individual resilient support—to the thickness of the material to be welded. In this manner, a uniform counter pressure is exerted in the direction of the sonotrode along the entire seam length so that the material of the foil wrapper can be uniformly welded together independently from the localized thicknesses of longitudinal seams, pinch folds, etc.

In order to ensure that the laminae may shift with respect to one another with ease in order to render effective solely the pressure exerted by the various resilient force generating arrangements, advantageously at least one of the two surfaces of adjoining laminae are provided with an anti-friction coating.

It will be understood that the above description of the present invention is susceptible to various modifications, changes and adaptations, and the same are intended to be comprehended within the meaning and range of equivalents of the appended claims. Such a coating may be, for example polytetrafluorethylene.

What is claimed is:

1. In an ultrasonic welding device including a sonotrode emitting vibratory energy and an anvil having a work face cooperating with the sonotrode for supporting a workpiece positioned for welding between the sonotrode and the anvil; the improvement in said anvil comprising
   (a) a housing means having a support base;
   (b) a plurality of laminae individually shiftably supported in said housing means in a face-to-face relationship for forming a lamina stack; each lamina having a first edge face at a side of the lamina stack; the first edge faces together constituting said work face of said anvil; each lamina having a second edge face situated opposite the first edge face; each lamina being of a resilient material and having a slot to define a springing lamina portion containing said second edge face; said springing lamina portion engaging said support base with said second edge face; and
   (c) force-exerting means for imparting individually to each said lamina a force oriented towards said sonotrode for individually urging each said lamina outwardly of said housing means in the direction of said sonotrode; said springing lamina portion forming part of said force-exerting means.

2. An ultrasonic welding device as defined in claim 1, wherein each of said laminae having a mass sufficiently large to take up reaction forces derived from the vibration of said sonotrode.

3. An ultrasonic welding device as defined in claim 1, wherein each said lamina has opposite large faces; at least one of said large faces of said laminae having an anti-friction layer thereon.

4. An ultrasonic welding device as defined in claim 1, comprising spring means for pressing said laminae together.

5. In an ultrasonic welding device including a sonotrode emitting vibratory energy and an anvil having a work face cooperating with the sonotrode for supporting a workpiece positioned for welding between the sonotrode and the anvil; the improvement in said anvil comprising
   (a) a housing means having a support base;
   (b) a plurality of laminae individually shiftably supported in said housing means in a face-to-face relationship for forming a lamina stack; each lamina having a first edge face at a side of the lamina stack; the first edge faces together constituting said work face of said anvil; each said lamina having a second edge face situated opposite the first edge face; and
   (c) force-exerting means for imparting individually to each said lamina a force oriented towards said sonotrode for individually urging each said lamina outwardly of said housing means in the direction of said sonotrode; said force-exerting means being disposed between said support base and the second edge face of said laminae; said force-exerting means comprising a resilient leg forming an integral part of each said laminae; each said resilient leg extending from the second edge face of the respective said lamina and engaging said support base.

6. An ultrasonic welding device as defined in claim 5, wherein each of said laminae having a mass sufficiently large to take up reaction forces derived from the vibration of said sonotrode.

7. An ultrasonic welding device as defined in claim 5, wherein each said lamina has opposite large faces; at least one of said large faces of said laminae having an anti-friction layer thereon.

8. An ultrasonic welding device as defined in claim 5, comprising spring means for pressing said laminae together.

9. In an ultrasonic welding device including a sonotrode emitting vibratory energy and an anvil having a work face cooperating with the sonotrode for supporting a workpiece positioned for welding between the sonotrode and the anvil; the improvement in said anvil comprising
   (a) a housing means having a support base;
   (b) a plurality of laminae individually shiftably supported in said housing means in a face-to-face relationship for forming a lamina stack; each lamina having a first edge face at a side of the lamina stack; the first edge faces together constituting said work face of said anvil; each said lamina having a second edge face situated opposite the first edge face; and
   (c) force-exerting means for imparting individually to each said lamina a force oriented towards said sonotrode for individually urging each said lamina outwardly of said housing means in the direction of said sonotrode; said force-exerting means being disposed between said support base and the second edge face of said laminae; said force-exerting means comprising separate springs each engaging said support base and the second edge face of said laminae.

10. An ultrasonic welding device as defined in claim 9, wherein each said lamina is associated with a single, separate said spring.

11. An ultrasonic welding device as defined in claim 9, wherein each of said laminae having a mass sufficiently large to take up reaction forces derived from the vibration of said sonotrode.

12. An ultrasonic welding device as defined in claim 9, wherein each said lamina has opposite large faces; at least one of said large faces of said laminae having an anti-friction layer thereon.

13. An ultrasonic welding device as defined in claim 9, comprising spring means for pressing said laminae together.

* * * * *